Sept. 16, 1924. 1,509,036
G. L. EMERSON
HONEY EXTRACTOR
Filed Jan. 20, 1920 2 Sheets-Sheet 1
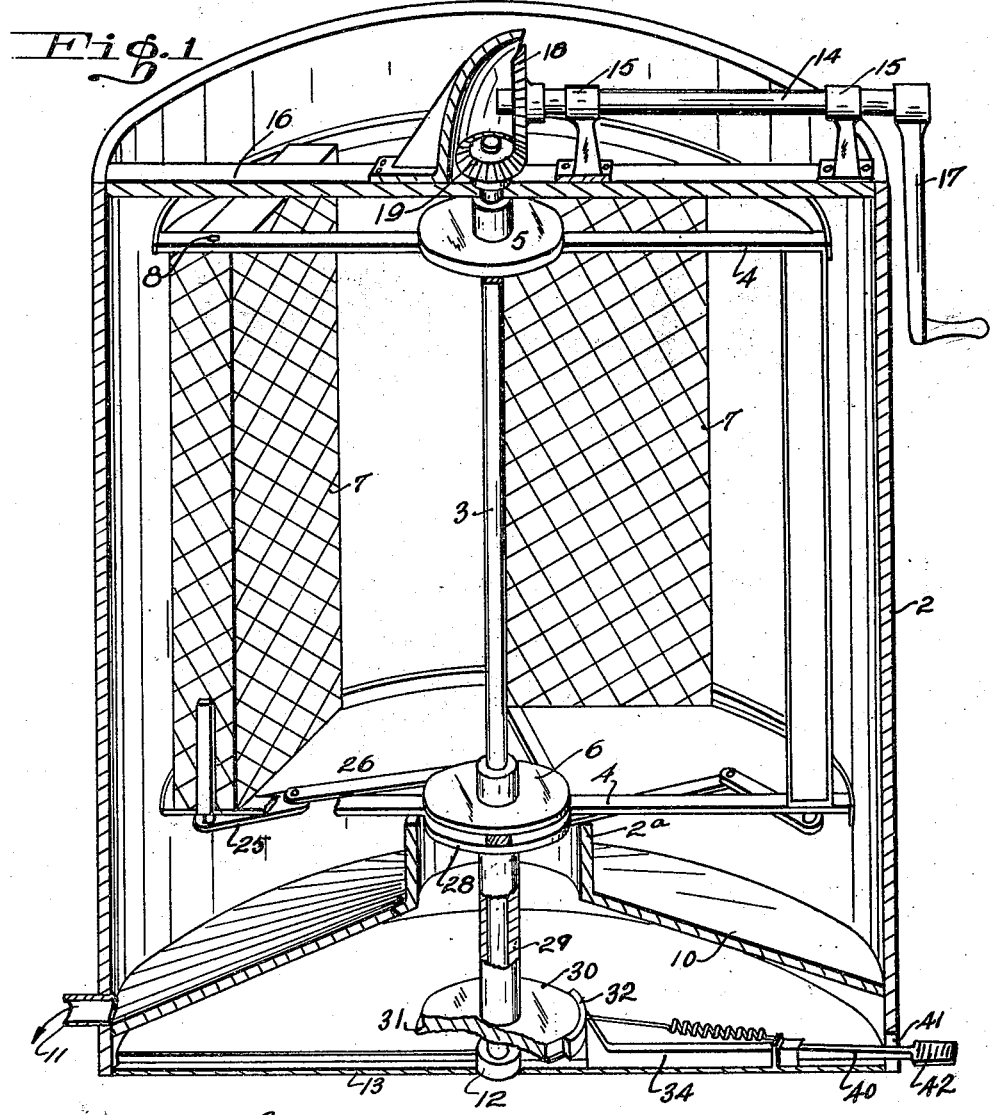
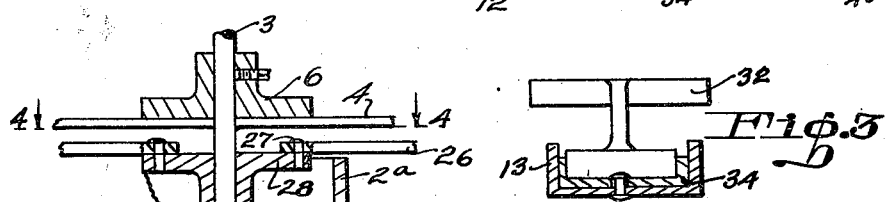
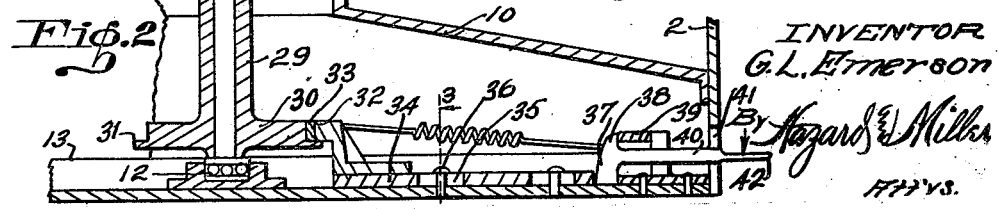
INVENTOR
G. L. Emerson
By Hazard & Miller
ATT'YS.

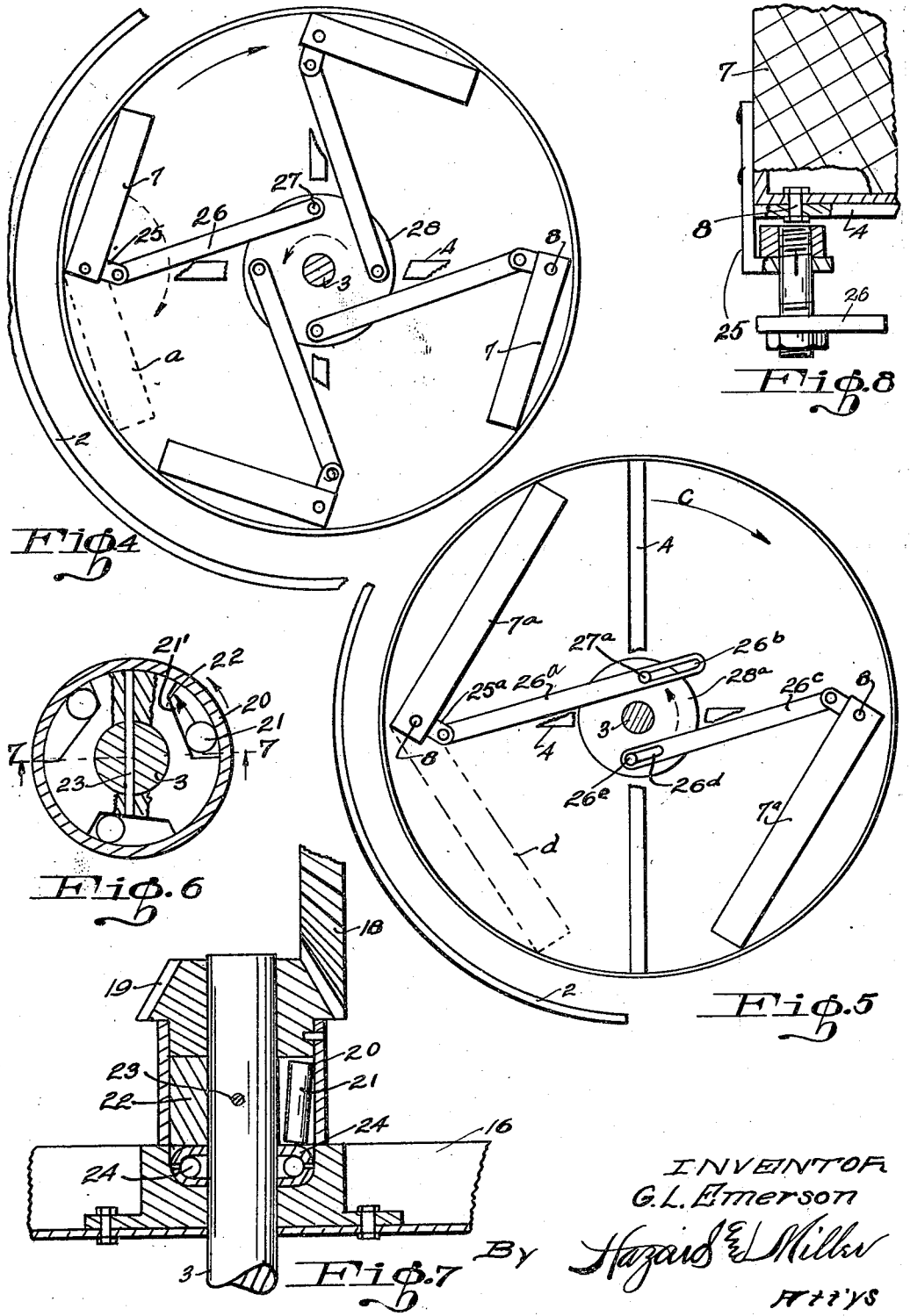

Patented Sept. 16, 1924.

1,509,036

UNITED STATES PATENT OFFICE.

GEORGE L. EMERSON, OF LOS ANGELES, CALIFORNIA, ASSIGNOR TO VICTOR V. KUNKEL, OF LOS ANGELES, CALIFORNIA.

HONEY EXTRACTOR.

Application filed January 20, 1920. Serial No. 352,779.

*To all whom it may concern:*

Be it known that I, GEORGE L. EMERSON, a citizen of the United States, residing at Los Angeles, in the county of Los Angeles and State of California, have invented new and useful Improvements in Honey Extractors, of which the following is a specification.

This invention relates to apparatus for extracting honey syrup from combs thereof, and has for an object to provide an apparatus which by centrifugal force separates the honey syrup from the comb. Further objects are to provide a device of this kind which is so constructed and operative that the recovered honey syrup is maintained in a clean condition away from contact with bearing parts of the apparatus, and to provide for the ready reversal of the position of the carrying baskets in which the honey comb frames may be arranged, and other objects as will be set forth hereinafter. The invention consists of the construction, the combination and in details and arrangements of the parts, embodiments of which are illustrated in the accompanying drawings and described and claimed herein.

Figure 1 is a perspective in section on a vertical plane with parts broken away showing an embodiment of the invention.

Fig. 2 is a detail sectional view through the lower portion of the apparatus showing the brake mechanism.

Fig. 3 is a transverse section on line 3—3 of Fig. 2.

Fig. 4 is a detail sectional view on line 4—4 of Fig. 2 showing a form of the reversing mechanism in plan.

Fig. 5 is a similar view showing a modified form of the reversing mechanism.

Fig. 6 is a detail sectional view through a form of clutch mechanism for connecting the driving shaft and the reel shaft.

Fig. 7 is a sectional view on line 7—7 of Fig. 6 showing in detail the clutch mechanism.

Fig. 8 is a detail sectional view of the reversing lever of one of the baskets and a portion of the latter to which it is applied.

In its illustrated form the invention comprises a suitable tank or vessel 2 that may be made of any proportion, shape and material and within which there is arranged a vertical shaft 3 carrying a reel including a series of radial arms 4 connected to respective top and lower discs 5 and 6 that are secured on the shaft 3 so as to rotate through an orbit a series of baskets 7 of reticulated construction and of generally oblong form set with their length vertically and pivoted adjacent the corners of one side at 8 in the outer ends of the reel arms 4.

One of the features of the present invention resides in the construction of the apparatus so as to prevent the honey syrup being recovered from contacting with the lower or step bearing construction of the shaft 3 with the obvious purpose of keeping the honey syrup in a clean and sanitary condition, and therefore I have shown a vessel 2 as having a central hollow hub 2$^a$ disposed well above the plane of the bottom end of the vessel 2 and arranged at the upper end of the frustoconoidal false bottom 10 converging upwardly toward the sleeve 2$^a$ so that the recovered honey syrup drains toward the perimeter of the inclined bottom 10 and may be drawn off through the outlet 11 thereof. The lower hub or disc 6 of the reel is shown as arranged just above the upper edge of the collar or sleeve 2$^a$ of the bottom and the shaft 3 extends downwardly through this sleeve and is supported in a suitable step bearing 12 in this case arranged in a transverse framework 13 or base of the vessel 2.

Motion is transmitted to the reel and its shaft by means of a driving shaft 14 arranged in suitable bearings 15 on the top transverse bridge 16 at the upper end of the vessel 2 and the outer end of the shaft 14 is shown as provided with a crank 17 though other suitable driving means may be employed.

On the inner end of the shaft 14 there is secured a master gear 18 engaging a pinion 19 that is loosely mounted on the shaft 3, and the hub of this pinion 19 is shown, Fig. 7, as pinned or otherwise secured to a sleeve 20 forming the outer member of a centrifugal clutch device including a set of outwardly movable rollers 21 mounted in recesses or pockets in a collar 22 keyed as at 23 to the shaft 3. In this case the shaft collar 22 is supported on an antifriction bearing 24 arranged in the transverse beam or bridge 16 across the top of the vessel.

From this it will be seen that when the crank shaft 14 is turned so as to rotate the pinion 19 with its sleeve 22 in the direction of the arrow in Fig. 6 the hub or collar 22 on the shaft 3 will be frictionally interlocked with the sleeve as the rollers 21 move outwardly on the inclined surfaces 21' provided at the bottoms of the pockets and, on the contrary, if at any time the shaft 14 is held against movement, then reel 3 and 4 may continue to revolve under momentum.

For the purpose of securing a reverse of the position of the several comb carrying members or baskets 7 at any time during the operation of the reel 4, the same may be accomplished through means a form of which is shown as comprising the following organization.

Connected rigidly to the lower pivoted corner of each of the carriers or baskets 7 is a lever arm 25 shown in Fig. 4 as extending substantially at right angles from its respective pivot 8 and frame 7 and the inner end of each lever 25 is connected by a link 26 to a respective crank pin 27, a suitable number of which are shown as arranged in a crank disc or plate 28 that is attached to the upper end of a sleeve 29, Figs. 1 and 2, and which crank disc 28 is shown as located at about the upper end of the central sleeve 2$^a$ through which the shaft 3 passes.

On the lower end of the sleeve 29 there is secured a brake drum 30 that may be provided with a flange 31 and adjacent to the circumference of this brake drum there is arranged a brake shoe 32 that may have a friction facing 33 of leather or other suitable material. This shoe 32 is shown as provided on the inner end of a sliding member 34 having longitudinal slots 35 to receive stationary guide pins 36 arranged in the transverse bottom frame or part 13.

The outer end of the sliding member 34 is disposed against the contiguous face of a lever 37 having an upwardly extending projection 38 to fulcrum against a fixed part or bearing 39 below and through which the shank 40 of the lever extends outwardly through an aperture 41 in the bottom portion of the vessel 2 and below the bottom 10. The outer end of the lever is provided with a treadle part 42 which when pressed downwardly serves, through the medium of the transverse head part 37 of the lever, to thrust the slide 34 inwardly and carry the shoe facing 33 into frictional engagement with the brake drum or disc 31 and hold the latter temporarily against rotation while the reel continues to swing in the direction of the full line arrow in Fig. 4.

This holding of the sleeve 29 with the crank disc 28 while the reel continues to turn results in a reaction against the links 26 and through them by the respective levers 25 causes the respective honey carrying frames or baskets 7 to swing to the dotted line position indicated at $a$, Fig. 4; this swinging occurring simultaneously for all of the baskets 7.

A slightly modified form of the baskets is indicated in Fig. 5 in which the baskets 7$^a$ are of such width that when they swing about their pivots 8 to a reverse position they sweep over the crank disc 28$^a$ and would, if means were not provided, interfere with each other. Therefore in the modification shown in Fig. 5 one of the links as 26$^a$ is shown as having an elongated slot 26$^b$ in its outer end engaging its respective crank pin 27$^a$.

Another link 26$^c$ is shown as having in its end an elongated slot 26$^d$ that is of less length than the slot 26$^b$ and with the position of the parts as shown in Fig. 5, and while the reel is revolving in the direction of the full line arrow $c$ in order to secure the successive reversal of the baskets 7$^a$ when the brake is applied to the drum 28$^a$ the link 26$^a$ which is shown with the inner end of its slot 26$^b$ engaging the pin 27$^a$ instantly reacts through the lever 25$^a$ to swing its respective basket 7$^a$, and as this swings across the center of the crank disc 28$^a$ under the reaction of the crank pin 27$^a$ it is further carried to its reverse position as at $d$ in dotted lines by centrifugal force.

During the initial movement of the basket 7$^a$ being turned by its link 26$^a$ the crank pin 26$^e$ is relatively moved inwardly along the slot 26$^d$ without consequent effect on the link 26$^c$, but as the pin 26$^e$ reaches the end of the slot 26$^d$ then there is a reaction of the link 26$^c$ on the lever of the respective frame 7$^a$ and the latter is swung inwardly and across the disc 28$^a$ in succession to the preceding movement of the other basket 7$^a$.

Preferably the levers 25 are connected to the lower portions of their baskets 7 and the bodies of the levers arranged at such plane that they will sweep through accumulated honey syrup in the bottom of the vessel before the syrup can overflow through the opening at the top of the central sleeve 2$^a$, and because of the resistance to the rotary motion caused by the sweeping of the members 25 through the honey the operator will thereupon cease rotation of the driving shaft 14 and thus avoid waste of the syrup.

By providing an opening in the bottom 10 of the vessel 2 through which the operating mechanism extends downwardly it will be seen that the bearing in which this mechanism is supported cannot become gummed up with honey, and that it is readily accessible for lubrication without possibility of any of the lubricant entering into the valuable honey being collected. A further advantage of the arrangement of the bearing below the bottom of the tank or vessel is that the strains of operation of the apparatus are entirely removed from the bottom joint structure of the tank. Again by the arrangement of the shaft mechanism with a portion extending through the bottom of the vessel it is possible to apply the brake or controlling mechanism thereto so that the brake can be operated by the foot of the operator and thus leave his hands free for manipulation or operation of other parts of the apparatus or to handle the honey frames.

It is understood that by the construction shown in Fig. 5 it is possible to use the standard size honey baskets or pockets in combination with the organization, and by the arrangement of the parts, as shown therein, the extracting tank or vessel can be made of comparatively small size by reason of the possibility of the baskets or pockets 7ª being swung in successive, clearing positions across the axis of rotation.

Various changes may be made without departing from the spirit of my invention, as claimed.

I claim:

1. A centrifugal honey extractor comprising a vessel with an upright shaft; a reel secured on the shaft and carrying reversible baskets to receive honey in combs; means for driving the shaft; and means for reversing the carriers while the reel shaft is driven; the vessel having an outlet adjacent to its lower portion and having a central sleeve open at its upper portion through which the reel shaft extends downwardly, the said reversing means being arranged so as to sweep in the extracted honey syrup in the bottom of the vessel and to retard driving action of the wheel before the level of the honey reaches the level of the opening of the said sleeve.

2. In a centrifugal honey extractor a vessel having a bottom provided with a bearing for an upright shaft, an upright shaft journaled for rotation in said bearing, a reel carried from said shaft and provided with reversible honey comb receiving baskets, an inclined false bottom for said vessel, the center of which false bottom is provided with an opening to receive the lower portion of the upright shaft and an annular wall on said false bottom around said opening, the upper portion of which annular wall terminates in a horizontal plane above the plane occupied by the lower portions of the reel whereby the latter will sweep through the upper strata of liquid honey before the same overflows the upper edge of said annular wall.

3. In a centrifugal honey extractor, a vessel having a bottom provided with a bearing for an upright shaft, an upright shaft journaled therein, a reel carried by said shaft and provided with reversible honey comb receptacles, an inclined false bottom for said vessel, the center of said false bottom being provided with an opening through which passes the lower portion of an upright shaft and an annular upstanding wall around the opening in said false bottom, the upper portion of which annular wall terminates in a horizontal plane above the plane occupied by the lower portions of the reel whereby the latter will sweep through the upper strata of liquid honey before the same overflows the upper edge of said annular wall and a pedally operated brake arranged in the chamber beneath the false bottom for controlling the rotary motion of the upright shaft.

4. In a centrifugal honey extractor, a vessel having a bottom provided with a bearing for an upright shaft, an upright shaft journaled therein, a reel carried by said shaft and provided with reversible honey comb receptacles, a frustoconical false bottom arranged in the lower portion of the vessel the center of which false bottom is provided with an opening to receive the lower portion of the upright shaft and an annular wall formed on said false bottom around the opening therein, the upper portion of which annular wall terminates in a horizontal plane above the plane occupied by the lower portions of the reel whereby the latter will sweep through the upper strata of liquid honey before the same overflows the upper edge of said annular wall.

5. In a centrifugal honey extractor, a vessel having a bottom provided with a bearing for an upright shaft, an upright shaft journaled therein, a reel carried by said shaft and provided with reversible honey comb receptacles, a frustoconical false bottom arranged in the lower portion of the vessel the center of which false bottom is provided with an opening to receive the lower portion of the upright shaft, an annular wall formed on said false bottom around the opening therein, the upper portion of which annular wall terminates in a horizontal plane above the plane occupied by the lower portions of the reel whereby the latter will sweep through the upper strata of liquid honey before the same overflows the upper edge of said annular wall and a pedally operated brake arranged in the chamber beneath said false bottom for controlling the rotation of the upright shaft.

In testimony whereof I have signed my name to this specification.

GEO. L. EMERSON.